(12) United States Patent
Ernst et al.

(10) Patent No.: US 9,683,515 B2
(45) Date of Patent: Jun. 20, 2017

(54) WASTE HEAT RECOVERY SYSTEM INCLUDING A MECHANISM FOR COLLECTION, DETECTION AND REMOVAL OF NON-CONDENSABLE GAS

(71) Applicant: Cummins, Inc., Columbus, IN (US)

(72) Inventors: Timothy C. Ernst, Columbus, IN (US); James A. Zigan, Versailles, IN (US)

(73) Assignee: CUMMINS, INC., Columbus, IN (US)

( * ) Notice: Subject to any disclaimer, the term of this patent is extended or adjusted under 35 U.S.C. 154(b) by 455 days.

(21) Appl. No.: 14/322,308

(22) Filed: Jul. 2, 2014

(65) Prior Publication Data

US 2015/0013935 A1   Jan. 15, 2015

Related U.S. Application Data

(60) Provisional application No. 61/842,283, filed on Jul. 2, 2013.

(51) Int. Cl.
*F02G 5/02* (2006.01)
*F01K 23/06* (2006.01)
*F28D 21/00* (2006.01)

(52) U.S. Cl.
CPC .............. *F02G 5/02* (2013.01); *F01K 23/065* (2013.01); *F28D 21/0014* (2013.01); *Y02T 10/166* (2013.01)

(58) Field of Classification Search
CPC ........ F02G 5/02; F01K 23/065; Y02T 10/166; F28D 21/0014

USPC ............... 60/618, 646, 657; 62/85, 195, 475
See application file for complete search history.

(56) References Cited

U.S. PATENT DOCUMENTS

| | | | |
|---|---|---|---|
| 1,911,464 A * | 5/1933 | Pearson | F25B 43/00 165/156 |
| 4,984,431 A * | 1/1991 | Mount | F25B 45/00 62/475 |
| 5,022,230 A * | 6/1991 | Todack | F25B 45/00 62/149 |
| 5,090,215 A * | 2/1992 | Giesler | F25B 45/00 62/149 |
| 5,209,074 A * | 5/1993 | McConnell | F25B 43/043 62/475 |
| 5,435,485 A | 7/1995 | Atterbury | |
| 5,487,765 A | 1/1996 | Kedar et al. | |
| 5,517,825 A | 5/1996 | Manz et al. | |
| 6,866,092 B1 | 3/2005 | Molivadas | |
| 2005/0077779 A1* | 4/2005 | Goodell | B01D 53/261 303/1 |
| 2012/0000200 A1 | 1/2012 | Freund et al. | |

* cited by examiner

*Primary Examiner* — Hoang Nguyen
(74) *Attorney, Agent, or Firm* — Foley & Lardner LLP

(57) ABSTRACT

The disclosure describes a non-condensable gas collection, detection, and removal system for a WHR system that helps to maintain cycle efficiency of the WHR system across the life of an engine system associated with the WHR system. A storage volume is configured to collect non-condensable gas received from the working fluid circuit, and a release valve is configured to selectively release non-condensable gas contained within the storage volume.

26 Claims, 5 Drawing Sheets

WASTE HEAT RECOVERY SYSTEM INCLUDING A MECHANISM FOR COLLECTION, DETECTION AND REMOVAL OF NON-CONDENSABLE GAS

CROSS-REFERENCE TO RELATED APPLICATIONS

The present application claims priority to U.S. Provisional Patent Application No. 61/842,283, filed Jul. 2, 2013 and the contents of which are incorporated herein by reference.

STATEMENT REGARDING FEDERALLY SPONSORED RESEARCH OR DEVELOPMENT

This invention was made with government support under "Recovery Act—System Level Demonstration of Highly Efficient and Clean, Diesel Powered Class 8 Trucks (Supertruck)," Program Award Number DE-EE0003403 awarded by the Department of Energy (DOE). The government has certain rights in the invention.

TECHNICAL FIELD

This disclosure relates to waste heat recovery systems and a system for collection and/or storage, detection, and removal of non-condensable gas from waste heat recovery systems.

BACKGROUND

A waste heat recovery (WHR) system to recover heat energy generated by an internal combustion engine that would otherwise be lost through cooling and heat rejection is one way to improve engine efficiency and to meet legislated and competitive fuel efficiency requirements for internal combustion engines. During operation of the WHR system, non-condensable vapor or gases can accumulate in various places in the WHR system, deteriorating performance of the WHR system.

SUMMARY

Various embodiments provide for a waste heat recovery system for use with an internal combustion engine, comprising a working fluid circuit, a fluid containing and cooling system positioned along the working fluid circuit, and a heat exchange portion positioned along the working fluid circuit. A feed pump is communicatively connected to the heat exchange portion along the working fluid circuit. The feed pump configured to pump a working fluid within the working fluid circuit. A non-condensable gas system is communicatively connected to the working fluid circuit. The non-condensable gas system includes a storage volume configured to collect non-condensable gas received from the working fluid circuit, a non-condensable gas detector configured to detect the presence of non-condensable gas within the storage volume, and a release valve configured to selectively release non-condensable gas contained within the storage volume.

Further embodiments provide for a non-condensable gas system for use with a waste heat recovery system associated with an internal combustion engine. A storage volume is configured to collect non-condensable gas received from a working fluid circuit of the waste heat recovery system. A non-condensable gas detector is configured to detect the presence of non-condensable gas within the storage volume. A release valve is configured to selectively release non-condensable gas contained within the storage volume.

Still further embodiments provide for an apparatus, comprising a working fluid circuit and a non-condensable gas system. The non-condensable gas system includes a storage volume configured to collect non-condensable gas received from the working fluid circuit, and a release valve configured to selectively release non-condensable gas contained within the storage volume.

Advantages and features of the embodiments of this disclosure will become more apparent from the following detailed description of exemplary embodiments when viewed in conjunction with the accompanying drawings.

DETAILED DESCRIPTION

During operation of a WHR system, non-condensable gases can accumulate in the WHR system. Non-condensable gases may enter a WHR system during periods when pressure in the WHR system falls below ambient or atmospheric pressure. Non-condensable gases may also enter the WHR system prior to charging the WHR system if evacuation of non-condensable gas is inadequate. Because non-condensable gases reduce or decrease the cycle efficiency of the WHR system by increasing pressure in a WHR condenser, and because non-condensable gases contaminate and can cause thermal breakdown of a liquid working fluid at lower temperatures than a pure liquid working fluid in the WHR system, it is be beneficial to collect such gases, to detect the presence of such gases or a sufficient quantity of such gases that removal is appropriate, and to remove such gases from the WHR system. The present disclosure provides a non-condensable gas collection, detection, and removal system for a WHR system that helps to maintain cycle efficiency of the WHR system across the life of an engine system associated with the WHR system.

Figure 1:
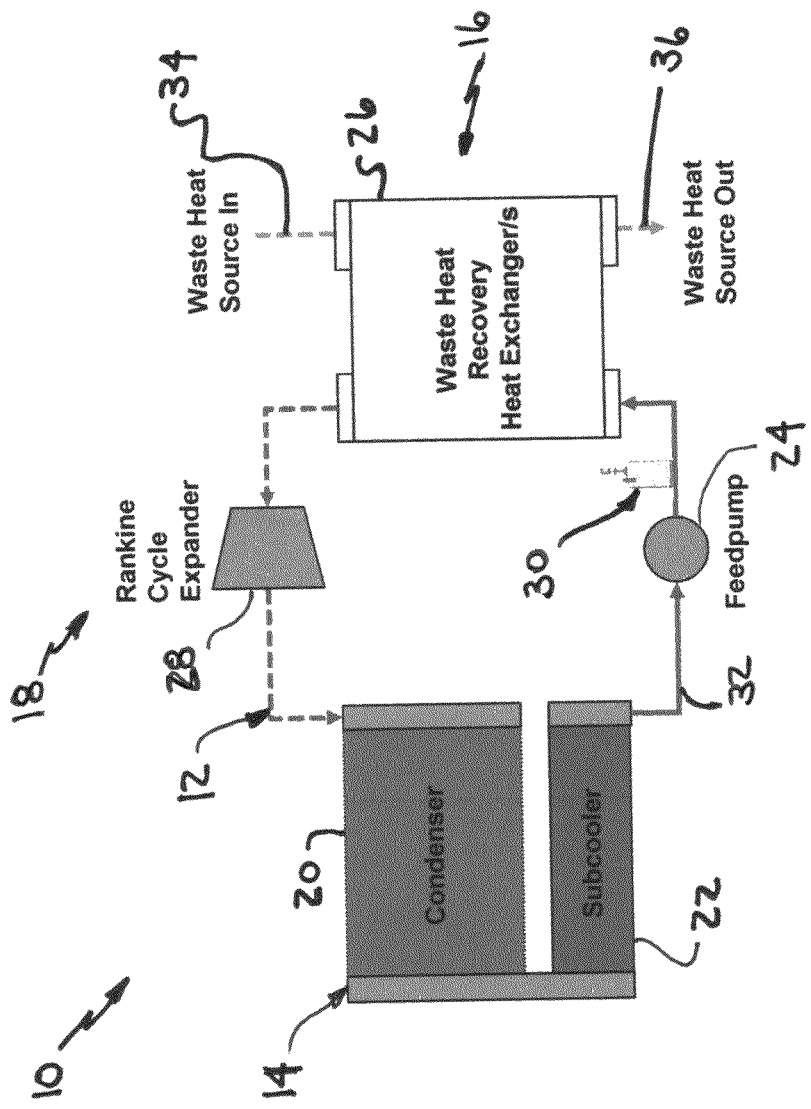
FIG. 1 is a simplified schematic of a WHR system incorporating a first embodiment of the present disclosure.

Turning now to FIG. 1, a WHR system incorporating an exemplary embodiment of the present disclosure is shown and generally indicated at 10. WHR system 10 includes a working fluid circuit 12, along which are located a fluid containment and cooling system (FCCS) 14, a heat exchange portion 16, and an energy capture system 18. FCCS 14 may include a variety of devices for containing and cooling a working fluid. For example, FCCS 14 may include a condenser 20 for changing the phase of a vaporized working fluid to a liquid. Condenser 20 may have a sub-cooling portion or a sub-cooler 22 located along working fluid circuit 12 downstream from condenser 20. FCCS 14 may include other elements, for example, a receiver, a pump, one or more valves, and/or other elements (not shown) to transfer fluid between the various components of FCCS 14.

A working fluid or feed pump 24 is located along working fluid circuit 12 downstream from FCCS 14. Feed pump 24 pulls liquid working fluid from FCCS 14 and pumps the liquid working fluid downstream along working fluid circuit 12 toward heat exchange portion 16. Heat exchange portion 16 includes at least one heat exchanger 26. Heat exchanger 26 may be a plurality of heat exchangers, such as an EGR heat exchanger, a pre-charge air cooler heat exchanger, an engine heat exchanger, an exhaust heat exchanger, a recuperator, or other heat exchangers that may benefit from an exchange of heat with the relatively cool liquid working fluid coming from FCCS 14. These heat exchangers may be in series, parallel, or a combination of series and parallel. Each of the heat exchangers in heat exchange portion 16 receives a heated fluid 34 from a source of waste heat. Heat fluid 34 is typically cooled as heat fluid 34 flows through heat exchanger(s) 26 and heat is transferred from heated fluid 34 to the working fluid flowing through working fluid circuit 12. A cooled fluid 36 flows either back to the system from which the heat fluid 34 originated, or to another system, depending on the type and source of heated fluid 34. Energy capture system 18 is positioned between heat exchange portion 16 and FCCS 14, downstream from heat exchange portion 16. Energy capture system 18 may include a conversion device 28 that powers an auxiliary system.

During operation of WHR system 10, liquid working fluid flow from FCCS 14 through feed pump 24. The liquid working fluid, now under pressure because of feed pump 24, flows downstream into heat exchange portion 16, which waste heat is transferred from a heat source to the liquid working fluid, which converts the liquid working fluid at least partially into a vapor. Upon exiting the heat exchange portion 16, the vaporized working fluid then flows into energy conversion portion or energy capture system 18. Energy capture system 18 is capable of producing additional work or transferring energy to another device or system. For example, Energy capture system 18 may be a turbine, piston, scroll, screw, vane, swash plate, or other type of gas expander that moves, e.g., rotates, as a result of expanding working fluid vapor to provide additional work. The additional work can be fed into the engine's driveline to supplement the engine's power either mechanically, hydraulically or electrically (e.g., by turning a generator), or it can be used to drive a generator and power electrical devices, parasitics or a storage battery (not shown). Alternatively, Energy capture system 18 can be used to transfer energy from one system to another system (e.g., to transfer heat energy from the waste heat recovery system to a fluid for a heating system).

A non-condensable gas collection, detection, and removal system 30, which may be called a non-condensable gas system 30, is positioned along working fluid circuit 12 downstream from FCCS 14 and upstream from heat exchange portion 16. Non-condensable gas system 30 may be positioned along working fluid circuit 12 downstream from feed pump 24 and upstream from heat exchange portion 16 or downstream from FCCS 14 and upstream from feed pump 24 in optional non-condensable gas system location 32. The positions shown for non-condensable gas system 30 are beneficial because the working fluid is liquid in both locations, particularly in the location downstream from feed pump 24 where the working fluid is at an elevated pressure that is well above a saturation pressure for the working fluid, meaning that the working fluid is entirely a liquid, so any gases at that location would be undesirable non-condensable gases.

In an alternative embodiment, rather than being positioned upstream of the heat exchange portion 16, the non-condensable gas system 30 may be positioned within the heat exchange portion 16. Such an arrangement may be used, for example, if there is a portion of the heat exchange portion 16 through which the working fluid is still in liquid form, the non-condensable gas system 30 may be included in this location (upstream of where any phase change of the working fluid occurs). Such a situation may exist, for example where a recuperator or other heat exchanger is used that accepts heat from lower temperature sources of waste heat from the engine, and this waste heat may not be sufficient to cause a phase change in the liquid working fluid. Therefore, the non-condensable gas system 30 may be placed in this location in order to properly collect the non-condensable gas.

Figure 2:
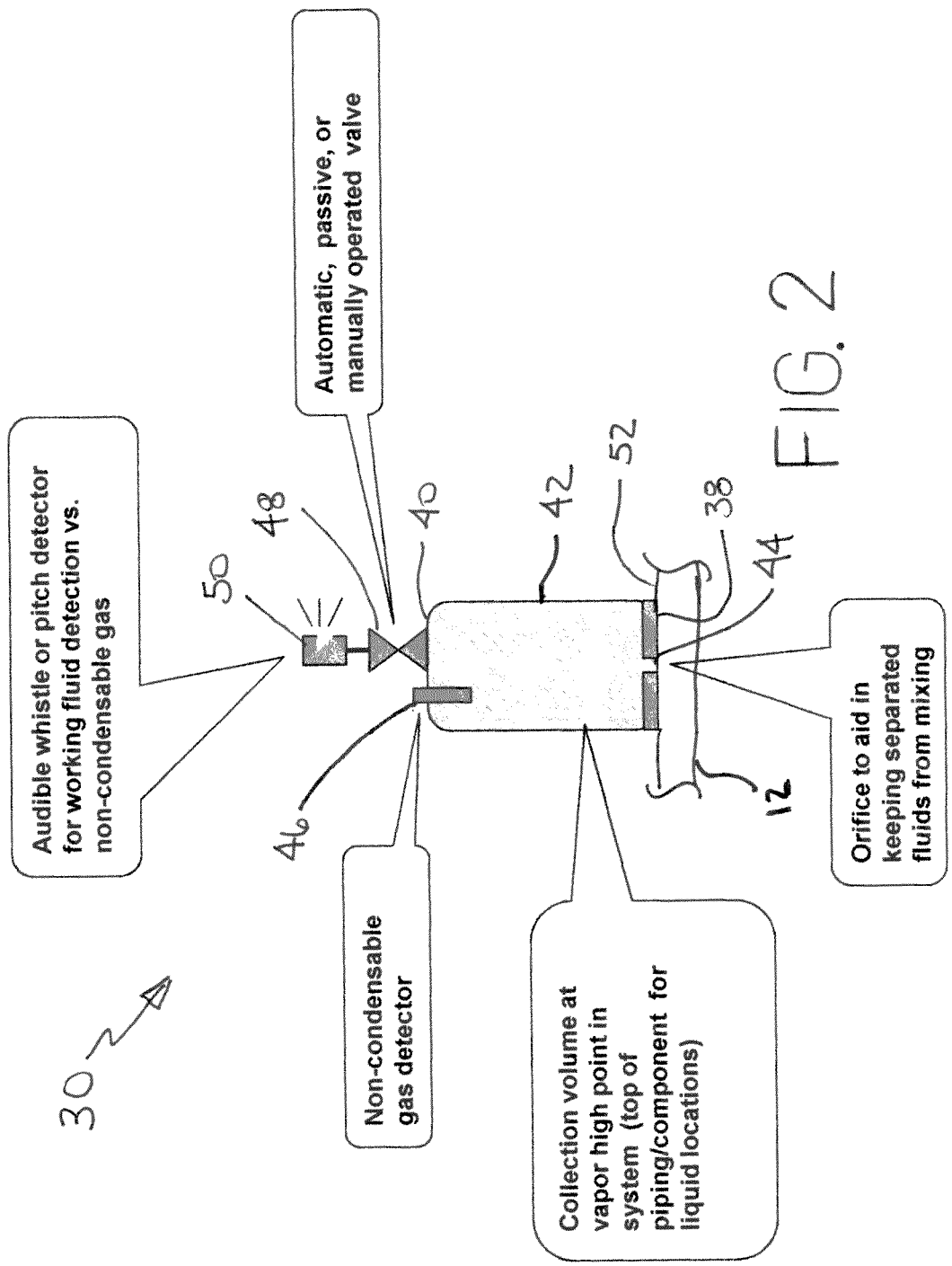
FIG. 2 is a simplified schematic of a gas collection, detection, and removal system of the WHR system of FIG. 1.

Turning now to FIG. 2, non-condensable gas system 30 is shown in greater detail. Non-condensable gas system 30 is physically oriented as shown in FIG. 2 because non-condensable gas system 30 requires gravity to assist in separating lighter, or less dense, non-condensable gases from the heavier, or denser, working fluid that flows through working fluid circuit 12. Thus, a lower or distal end 38 of non-condensable gas system 30 is oriented downwardly and a proximate or upper end 40 is oriented upwardly. Furthermore, non-condensable gas system 30 is preferably positioned on a top side of a conduit, pipe, or tube 52 of working fluid circuit 12 to encourage gravity separation of the lighter non-condensable gas, which rises into non-condensable gas system 30, from a liquid working fluid, which remains lower and closer to conduit 52. As will be seen, the physical orientation of non-condensable gas system 30 assists in the separation of working fluid from non-condensable gases.

Non-condensable gas system 30 includes a storage or collection volume 42, an inlet orifice 44 positioned between storage or collection volume 42 and working fluid circuit 12, a non-condensable gas detector 46, a release valve 48, and may include an audible whistle or pitch detector 50. As working fluid flows through working fluid circuit 12, non-condensable gases, which include nitrogen, oxygen, and other similar atmospheric gases, tend to rise since the density of the working fluid is generally greater than the density of non-condensable gases. Thus, the lighter or less dense non-condensable gases tend to accumulate in top portions of WHR system 10 when the flow of working fluid permits such non-condensable gases to accumulate. In an exemplary embodiment, the working fluid may be R245fa, which has a vapor density that is about six times the vapor density of atmospheric gases. If the working fluid is liquid, the density difference between the liquid working fluid and non-condensable gases is much greater, and the non-condensable gases tend to be forced upwardly in places such as that where non-condensable gas system 30 is located because storage or collection volume 42 extends longitudinally in a vertical direction. In an exemplary embodiment, non-condensable gas system 30 is in a location that represents a vapor high point to encourage non-condensable gases or vapor to accumulate at non-condensable gas system 30 and to then flow into non-condensable gas system 30.

Orifice 44 is sized and dimensioned to permit non-condensable gases to enter storage or collection volume 42 easily, but limits swirl and mixing that would otherwise be caused by working fluid flowing through working fluid circuit 12 past orifice 44.

Positioned within storage or collection volume 42 may be non-condensable gas detector 46. Non-condensable gas detector 46 may be one of several types of gas detector. For example, non-condensable gas detector 46 could be a tuning fork type of sensor that resonates at a different frequency for each gas having a different density. Thus, the tuning fork sensor would resonate at one frequency in the relatively dense working fluid of working fluid circuit 12 and would resonate at a different frequency in the less dense non-condensable gases that may collect in storage or collection volume 42. Another type of detector is a "time of flight" detector or sensor that detects the speed of sound in vapor or gas. Such detectors operate on the known principle that the speed of sound is directly related to the density of the medium in which the sound travels. Other types of sensors may also be suitable to detect the presence of non-condensable gases. While the position of non-condensable gas detector or sensor 46 is shown near the top of storage or collection volume 42, non-condensable gas detector 46 may be positioned lower in storage or collection volume 42 to permit a greater amount, concentration, or volume of non-condensable gas to accumulate before needing a purge of such gases. In an alternative embodiment, non-condensable gas detector 46 may provide a signal to an operator indicator advising an operator of a system, such as a vehicle, that non-condensable gases require purge from storage or collection volume 42.

Once a volume of non-condensable gas has accumulated in storage or collection volume 42, which may be detected by non-condensable gas detector 46, the non-condensable gas needs to be purged from storage or collection volume 42. Such purging may be either automatic or manual and may be through release valve 48, which is positioned near proximate end 40 of non-condensable gas system 30. More specifically, since storage or collection volume 42 extends longitudinally along a vertical direction, release valve 48 is positioned near a high point, upper end, or top of storage or collection volume 42. In one embodiment, if the depth of non-condensable gas detector 46 is sufficient to indicate a specific volume of non-condensable gas, then a control circuit (not shown) could be automatically triggered by non-condensable gas detector 46 to send a signal to release valve 48 to open for a predetermined length of time to permit the accumulated non-condensable gas to escape from storage or collection volume 46. In another embodiment, release valve 48 may be a passive device that opens when the density of gas adjacent to release valve 48 falls below a predetermined density. In another embodiment, release valve 48 may be a manually operated valve.

Figure 3:
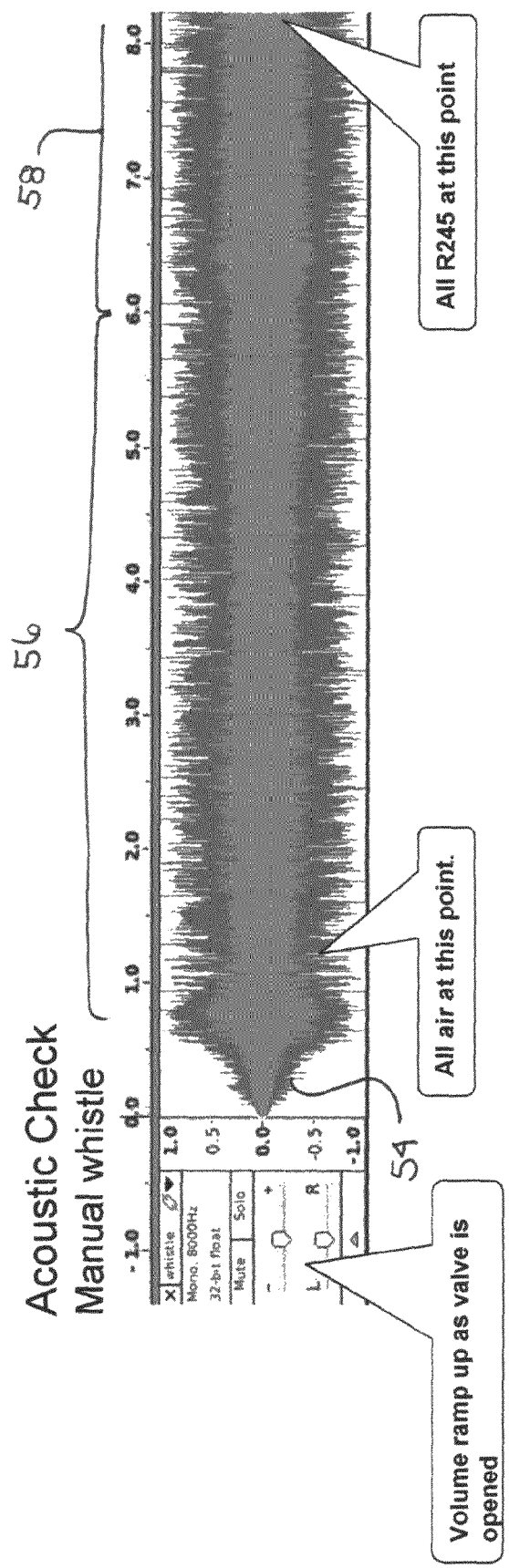
FIG. 3 is an acoustic signal from an audible indicator in accordance with an embodiment of the present disclosure.
Figure 4:
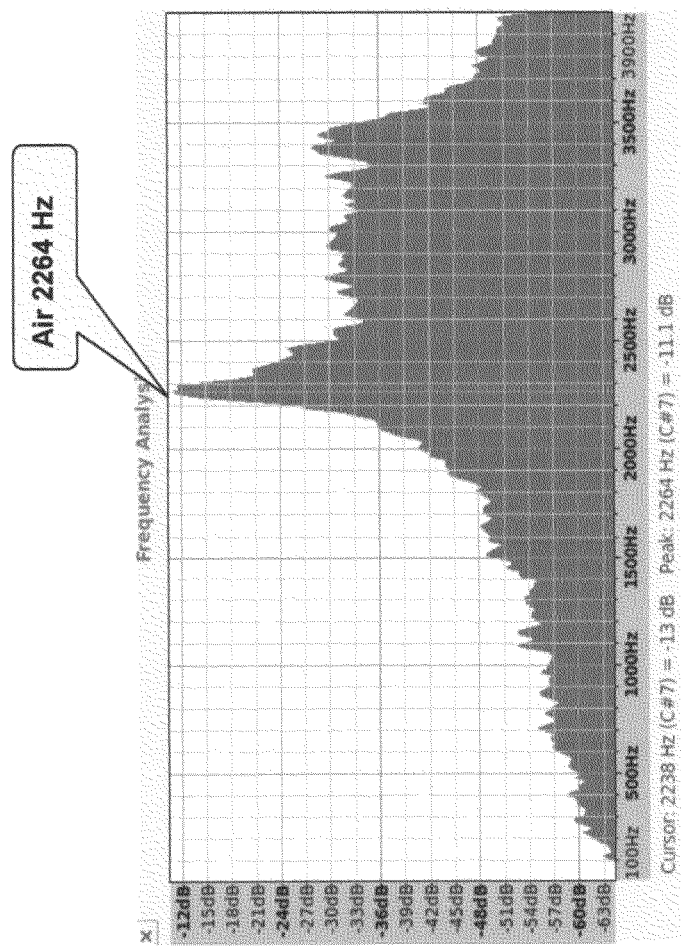
FIG. 4 is a frequency analysis of the signal of FIG. 3 during release of non-condensable gas from a WHR system.
Figure 5:
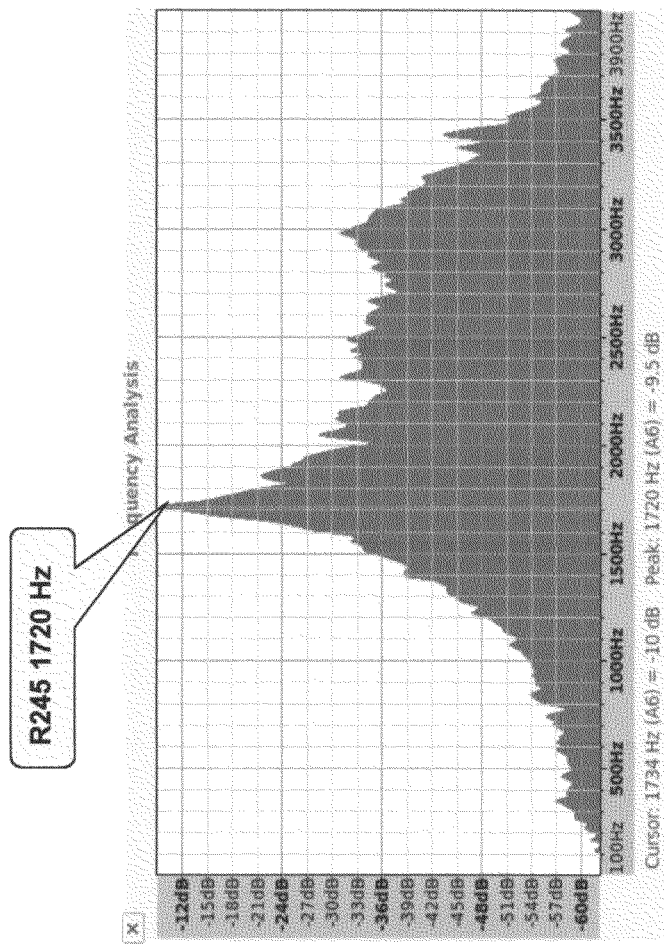
FIG. 5 is a frequency analysis of the signal of FIG. 3 during release of a working fluid from a WHR system.

If release valve 48 is a manually operated valve, an operator may be instructed to purge storage or collection volume 42 for a specific length of time that would assure release of a specific volume of non-condensable gas, or an operator would require an indication that only non-condensable gas is being purged from storage or collection volume 42. In an exemplary embodiment, one indicator may be in the form of audible whistle, pitch detector, or indicator 50, or audible indicator 50. As shown in FIGS. 3-5, the pitch or frequency emitted by audible indicator 50 varies based on the density of gas flowing through audible indicator 50. Such pitch or frequency changes may be readily discerned by an operator or may be detected by a sensor (not shown). It should be understood that pitch and frequency, while not identical, refer to detectable variations in sound as perceived by a human ear, which may be detected as pitch, or refer to a predominant frequency that may be detectable by a human ear or a sensor. Referring to FIG. 3, the frequency of gases flowing through audible indicator 50 during a purge is shown. During an initial portion of purge 54, volume increases or ramps up as release valve 48 is opened. Once release valve 48 is opened and non-condensable gas is released, the frequency of audible indicator 50 achieves a first frequency during a purge interval 56, which is further indicated in FIG. 4, which shows that the release of non-condensable gas through audible indicator 50 emits a first frequency, which in the example shown is 2,264 Hz. Once non-condensable gas has been purged from storage or collection volume 42, further release of fluid from storage or collection volume 42 would be working fluid. Working fluid flowing through audible indicator 50 emits a second, lower frequency, shown at an interval 58 in FIG. 3, because of the higher density as compared to the non-condensable gas and which in the example shown in FIG. 5 is 1,720 Hz. Because of the separation between frequencies emitted by audible indicator 50, which in the example hereinabove is 544 Hz, the frequency difference is readily discernible by an operator, or a control circuit may readily be configured to close release valve 48 as the frequency shifts away from the frequency generated by the flow of non-condensable gas, minimizing release of working fluid.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

The invention claimed is:

1. A waste heat recovery system, comprising:
   a working fluid circuit;
   a fluid containing and cooling system positioned along the working fluid circuit;
   a heat exchange portion positioned along the working fluid circuit;
   a feed pump communicatively connected to the heat exchange portion along the working fluid circuit, the feed pump configured to pump a working fluid within the working fluid circuit, the feed pump configured to:
      receive the working fluid from the fluid containing and cooling system, and
      provide the working fluid to the heat exchange portion; and
   a non-condensable gas system communicatively connected to the working fluid circuit, the non-condensable gas system including:
      a storage volume configured to collect non-condensable gas received from the working fluid circuit,
      a non-condensable gas detector configured to detect the presence of non-condensable gas within the storage volume, and
      a release valve configured to selectively release non-condensable gas contained within the storage volume.

2. The waste heat recovery system of claim 1, wherein the non-condensable gas system is coupled to an upper surface of a conduit of the working fluid circuit such that non-condensable gas from the working fluid circuit naturally flows upwardly into the storage volume.

3. The waste heat recovery system of claim 1, wherein the non-condensable gas detector is configured to resonate at a different frequency for each of a plurality of gases, each of the plurality of gases having a different density.

4. The waste heat recovery system of claim 1, wherein the non-condensable gas detector is configured to detect a speed of sound in a vapor or a gas.

5. The waste heat recovery system of claim 1, wherein the non-condensable gas detector is configured to provide a signal to a system operator, the signal indicating that non-condensable gas needs to be purged from the storage volume.

6. The waste heat recovery system of claim 5, wherein the signal is an audible signal.

7. The waste heat recovery system of claim 5, wherein the non-condensable gas detector is configured to provide a supplemental signal to the system operator, the supplemental signal indicating that non-condensable gas no longer needs to be purged from the storage volume.

8. The waste heat recovery system of claim 1, wherein the non-condensable gas detector is configured to provide a signal to the release valve, the signal indicative of the presence of a predetermined amount of non-condensable gas within the storage volume, and wherein the release valve is configured to automatically open in response to the provided signal.

9. The waste heat recovery system of claim 5, wherein the non-condensable gas detector is configured to provide a supplemental signal to the release valve, the supplemental signal indicating that non-condensable gas no longer needs to be purged from the storage volume, and wherein the release valve closes in response to the supplemental signal.

10. The waste heat recovery system of claim 1, wherein the release valve is configured to open when a density of gas adjacent the release valve falls below a predetermined density.

11. The waste heat recovery system of claim 1, wherein the release valve is manually actuable by an operator.

12. The waste heat recovery system of claim 1, wherein the feed pump is positioned downstream of the fluid containing and cooling system and upstream of the heat exchange portion, and wherein the non-condensable gas system is communicatively positioned between the feed pump and the heat exchange portion.

13. A non-condensable gas system for use with a waste heat recovery system, comprising:
  a storage volume configured to collect non-condensable gas received from a working fluid circuit of the waste heat recovery system;
  a non-condensable gas detector configured to detect the presence of non-condensable gas within the storage volume;
  a release valve configured to selectively release non-condensable gas contained within the storage volume; and
  an orifice positioned between the storage volume and the working fluid circuit, the orifice configured to inhibit the transfer of working fluid from the working fluid circuit into the storage volume while simultaneously facilitating the transfer of the non-condensable gas into the storage volume.

14. The non-condensable gas system of claim 13, wherein the non-condensable gas detector is configured to resonate at a different frequency for each of a plurality of gases, each of the plurality of gases having a different density.

15. The non-condensable gas system of claim 13, wherein the non-condensable gas detector is configured to detect a speed of sound in a vapor or a gas.

16. The non-condensable gas system of claim 13, wherein the non-condensable gas detector is configured to provide a signal to a system operator, the signal indicating that non-condensable gas needs to be purged from the storage volume.

17. The non-condensable gas system of claim 16, wherein the signal is an audible signal.

18. The non-condensable gas system of claim 16, wherein the non-condensable gas detector is configured to provide a supplemental signal to the system operator, the supplemental signal indicating that non-condensable gas no longer needs to be purged from the storage volume.

19. The non-condensable gas system of claim 13, wherein the non-condensable gas detector is configured to provide a signal to the release valve, the signal indicative of the presence of a predetermined amount of non-condensable gas within the storage volume, and wherein the release valve is configured to automatically open in response to the provided signal.

20. The non-condensable gas system of claim 19, wherein the non-condensable gas detector is configured to provide a supplemental signal to the release valve, the supplemental signal indicating that non-condensable gas no longer needs to be purged from the storage volume, and wherein the release valve is configured to automatically close in response to the supplemental signal.

21. The non-condensable gas system of claim 13, wherein the release valve is configured to open when a density of gas adjacent the release valve falls below a predetermined density.

22. An apparatus, comprising:
  a working fluid circuit including a fluid containing and cooling system, a heat exchanger, and a feed pump; and
  a non-condensable gas system including:
    a storage volume configured to collect non-condensable gas received from the working fluid circuit, and
    a release valve configured to selectively release non-condensable gas contained within the storage volume;
  wherein the non-condensable gas system is configured to receive refrigerant and the non-condensable gas from the fluid containing and cooling system and to provide the refrigerant to the heat exchanger; and
  wherein the feed pump is located between the heat exchanger and the non-condensable gas system.

23. The apparatus of claim 22, wherein the non-condensable gas system is coupled to an upper surface of a conduit of the working fluid circuit such that non-condensable gas from the working fluid circuit naturally flows upwardly into the storage volume.

24. The apparatus of claim 22, wherein the non-condensable gas system includes an orifice through which the non-condensable gas passes from the working fluid circuit, the orifice sized to limit swirling or mixing of the non-condensable gases within the storage volume.

25. The apparatus of claim 22, further comprising a non-condensable gas detector configured to detect the presence of non-condensable gas within the storage volume.

26. The apparatus of claim 25, wherein the non-condensable gas detector is further configured to provide a signal to at least one of a system operator and the release valve upon detecting the presence of a predetermined level of non-condensable gas within the storage volume.

\* \* \* \* \*